US007228532B1

(12) United States Patent
Shaylor et al.

(10) Patent No.: US 7,228,532 B1
(45) Date of Patent: Jun. 5, 2007

(54) METHOD AND APPARATUS TO FACILITATE CODE VERIFICATION AND GARBAGE COLLECTION IN A PLATFORM-INDEPENDENT VIRTUAL MACHINE

(75) Inventors: Nicholas Shaylor, Sunnyvale, CA (US); Douglas N. Simon, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 825 days.

(21) Appl. No.: 10/603,438

(22) Filed: Jun. 24, 2003

Related U.S. Application Data (60) Provisional application No. 60/412,607, filed on Sep. 20, 2002, provisional application No. 60/392,375, filed on Jun. 26, 2002.

(51) Int. Cl.
  G06F 9/45      (2006.01)
  G06F 12/00     (2006.01)
  G06F 9/30      (2006.01)
  G11B 5/09      (2006.01)
(52) U.S. Cl. .................. 717/147; 369/47.33; 707/206; 712/202
(58) Field of Classification Search ................. 717/147
See application file for complete search history.

(56) References Cited

U.S. PATENT DOCUMENTS 5,893,121 A * 4/1999 Ebrahim et al. ............ 707/206
6,047,125 A * 4/2000 Agesen et al. ............. 717/148
6,058,457 A * 5/2000 Tremblay et al. ........... 711/132
6,253,215 B1 * 6/2001 Agesen et al. ............. 707/206
6,532,531 B1 * 3/2003 O'Connor et al. .......... 712/202
6,748,503 B1 * 6/2004 Morrison .................... 711/159

OTHER PUBLICATIONS

Shaylor, N., Simon, D. N., and Bush, W. R. 2003. A java virtual machine architecture for very small devices. In Proceedings of the 2003 ACM SIGPLAN Conference on Language, Compiler, and Tool For Embedded Systems (San Diego, California, USA, Jun. 11-13, 2003). LCTES '03. ACM Press, New York NY, 34-41. DOI=http://doi.acm.org/10.1145/780732.780738.*
Nik Shaylor, Aug. 2 2002, "A Just-In-Time compiler for memory constrained low-power devices", USENIX Association, Proceedings of the Java™ Virtual Machine Research and Technology Symposium (JVM '02), 8 pages + cover.*
Leroy, X. 2002. Bytecode verification on Java smart cards. Softw. Pract. Exper. 32, 4 (Apr. 2002), pp. 319-340.*

(Continued)

Primary Examiner—Tuan Dam
Assistant Examiner—J. Derek Rutten
(74) Attorney, Agent, or Firm—Park, Vaughan & Fleming, LLP; Edward J. Grundler (57) ABSTRACT

One embodiment of the present invention provides a system that facilitates code verification and garbage collection in a platform-independent virtual machine. The system operates by first receiving a code module written in a platform-independent language. Next, the system examines the code module to locate calls to program methods within the code module. The system then transforms the code module so that all operands remaining on the evaluation stack only relate to the called method when the method is called, thereby simplifying verification and garbage collection of the code module.

15 Claims, 5 Drawing Sheets

OTHER PUBLICATIONS

Agesen, O., Detlefs, D., and Moss, J. E. 1998. Garbage collection and local variable type-precision and liveness in Java virtual machines. In Proceedings of the ACM SIGPLAN 1998 Conference on Programming Language Design and Implementation (Montreal, Quebec, Canada, Jun. 17-19, 1998). A. M. Berman, Ed. PLDI '98. ACM Press, New York, NY, 269-279.*

Cheng, P., Harper, R., and Lee, P. 1998. Generational stack collection and profile-driven pretenuring. In Proceedings of the ACM SIGPLAN 1998 Conference on Programming Language Design and Implementation (Montreal, Quebec, Canada, Jun. 17-19, 1998). A. M. Berman, Ed. PLDI '98. ACM Press, New York, NY, 162-173.*

* cited by examiner

METHOD AND APPARATUS TO FACILITATE CODE VERIFICATION AND GARBAGE COLLECTION IN A PLATFORM-INDEPENDENT VIRTUAL MACHINE

RELATED APPLICATION

This application hereby claims priority under 35 U.S.C. §119 to U.S. Provisional Patent Application No. 60/392,375, filed on 26 Jun. 2002, entitled "Optimizing Platform-independent Code," by inventors Nicholas Shaylor and Douglas Simon and to U.S. Provisional Patent Application No. 60/412,607, filed on 20 Sep. 2002, entitled "The Squawk System," by inventors Nicholas Shaylor and Douglas Simon.

The subject matter of this application is related to the subject matter in a co-pending non-provisional application by the same inventors as the instant application entitled, "Method and Apparatus for Converting a Synchronized Method Into a Non-Synchronized Method," having Ser. No. 10/456,351, and filing date 6 Jun. 2003.

BACKGROUND

1. Field of the Invention

The present invention relates to the design of platform-independent virtual machines. More specifically, the present invention relates to a method and an apparatus to facilitate code verification and garbage collection in a platform-independent virtual machine.

2. Related Art

Dramatic advances in computer technology presently make it possible to integrate a significant amount of computing power onto "smart cards." Smart cards are presently used in a variety of applications that solve common security and identity needs. For example, smart cards have been integrated into credit cards, debit cards, corporate badges, and even cell phones.

New smart card designs can accommodate larger amounts of memory. For example, new smart card designs can accommodate up to 160K bytes of read-only memory (ROM), 64 K bytes of electrically erasable programmable read-only memory (EEPROM), and 8 K bytes of random access memory (RAM). These larger amounts of memory make it possible to integrate more functionality into a smart card.

In particular, the additional memory can be used to implement a virtual machine, such as the JAVA™ virtual machine (JVM), in a smart card, and to allow the use of objects defined within an object-oriented programming system. (JAVA is a trademark of SUN Microsystems, Inc. of Santa Clara, Calif.) Integrating a virtual machine into a smart card enables the smart card to execute a large number of platform-independent applications. Moreover, the associated development environment for the virtual machine can simplify the process of developing applications for smart cards.

While it is possible to implement a virtual machine on one of these smart cards, the memory is still quite limited compared to a typical desktop computer system. This limited memory leads to many challenges in the implementing a virtual machine.

One problem is that programming languages, such as JAVA and corresponding JAVA bytecodes, are often unnecessarily complicated, which leads to unnecessary complexity in the virtual machine. In particular, the JAVA programming language (and corresponding JAVA bytecodes) can leave data on the stack during a call to a method. This data can cause difficulties during code verification and garbage collection because this data is left between activation records where it complicates the garbage collection and verification processes. For example, in the Connected Limited Device Configuration (CLDC) version of Java, bytecodes include a typemap for each basic block within the method. A typemap provides a map of local variable and stack types in a method. Having multiple typemaps per method unnecessarily complicates garbage collection because the garbage collector needs to access each of these typemaps during garbage collection. Additionally, variables can hold different types of data at different times. A variable in one instance can be a pointer and the same variable at another time can be a primitive data type, such as an integer or float. This causes difficulties for the garbage collector and verifier because they have to determine the type of a variable before completing their functions.

Hence, what is needed is a method and an apparatus that facilitates code verification and garbage collection in a platform-independent virtual machine without the problems described above.

SUMMARY

One embodiment of the present invention provides a system that facilitates code verification and garbage collection in a platform-independent virtual machine. The system operates by first receiving a code module written in a platform-independent language. Next, the system examines the code module to locate calls to program methods within the code module. The system then transforms the code module so that all operands remaining on the evaluation stack only relate to the called method when the method is called, thereby simplifying verification and garbage collection of the code module.

In a variation of this embodiment, transforming the code module involves ensuring that local variables hold only values of a single type and do not hold variables of different types at different times.

In a further variation, transforming the code module involves ensuring that the evaluation stack includes only elements related to a bytecode that may trigger garbage collection when the bytecode is executed.

In a further variation, transforming the code module involves ensuring that only parameters for the program method are on the evaluation stack when the program method is called.

In a further variation, transforming the code module involves spilling to memory stack slots that do not include operands for the call to the program method. Upon return from the program method, the system can fill stack slots that were previously spilled.

In a further variation, the program method is associated with a single typemap that indicates a type for each variable on the evaluation stack.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Smart Card

Figure 1:
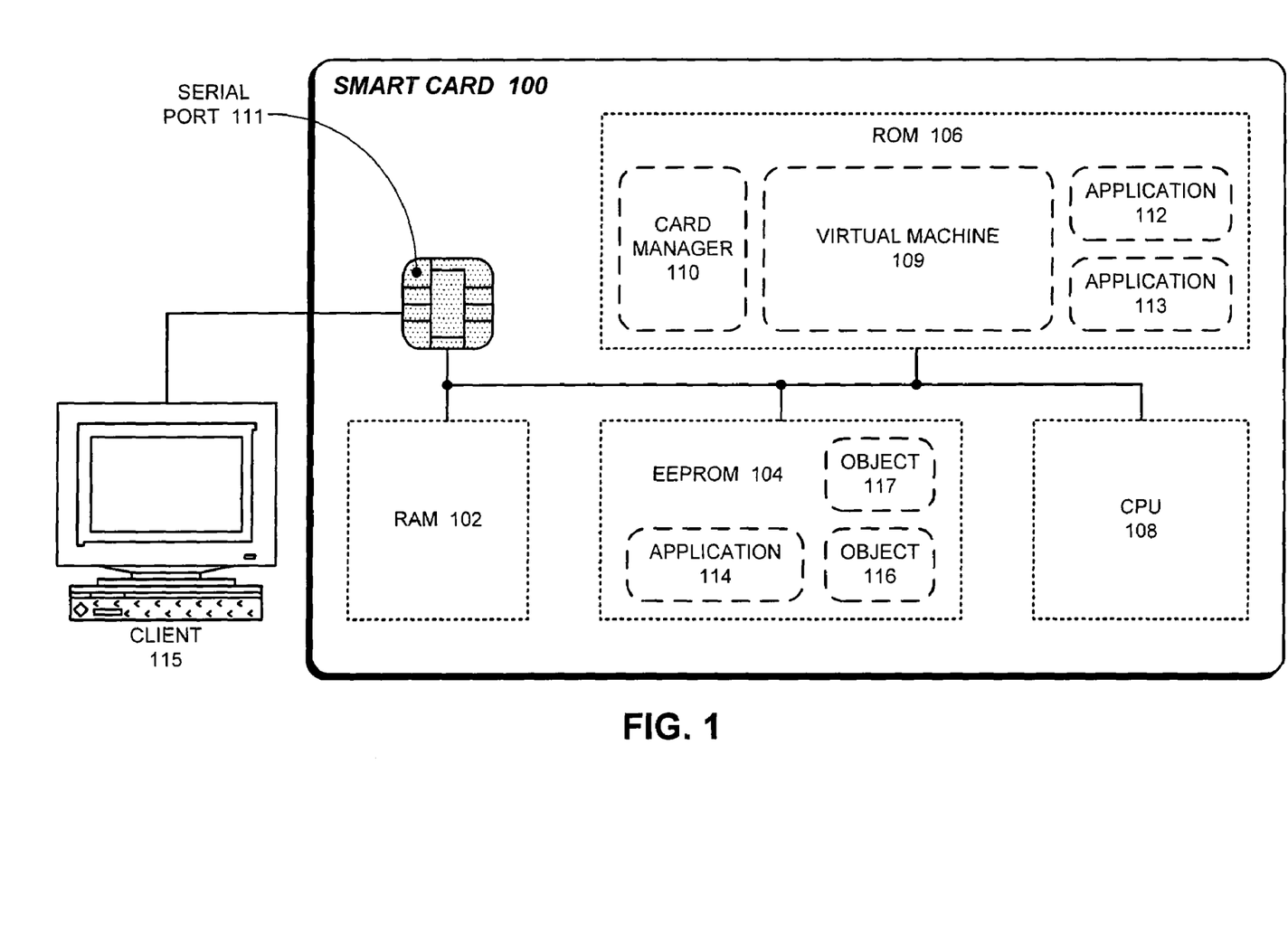
FIG. 1 illustrates a smart card in accordance with an embodiment of the present invention.

FIG. 1 illustrates a smart card in accordance with an embodiment of the present invention. Smart card 100 can generally include any type of miniature computing device, such as may be located within identification cards, client loyalty cards, electronic wallets, data cards, and cellular telephones. However, note that the present invention is not meant to be limited to smart cards, and can generally be applied to any type of computing device or computer system that provides support for code verification and garbage collection in a platform-independent virtual machine.

Smart card 100 contains a central processing unit (CPU) 108, which includes circuitry for performing computational operations. Smart card 100 also contains a number of different types of memory, including random access memory (RAM) 102, electrically erasable programmable read-only memory (EEPROM) 104, and read-only memory (ROM) 106.

In general, RAM 102 can include any type of volatile random access memory; EEPROM 104 can include any type of writeable non-volatile memory, such as EEPROM, flash memory, or magnetic memory; and ROM 106 can include any type of read-only memory.

ROM 106 contains a virtual machine 109, such as the JAVA virtual machine developed by SUN Microsystems, Inc. of Santa Clara, Calif. Note that applications written in a platform-independent programming language, such as the JAVA programming language, can be compiled into corresponding platform-independent bytecodes that can be executed on virtual machine 109.

ROM 106 also contains a number of applications, 112 and 113, which provide services for client 115, which access smart card 100 through serial port 111. Other applications, such as application 114, can be located in EEPROM 104. Yet other applications (not illustrated) may be located in both ROM 106 and EEPROM 104.

ROM 106 also includes a card manager 110, which manages the execution of applications on smart card 100. For example, suppose client 115 wishes to access a service provided by applications 112 on smart card 100. Client 115 first communicates with card manager 110. Card manager 110 then puts client 115 in contact with application 112. This allows client 115 to communicate directly with application 112.

EEPROM 104 also contains a number of objects 116–117, which are accessed by applications 112–114. Note that some objects or portions of objects may be located within RAM 102.

Executing Class Files on a Smart Card Virtual Machine

Figure 2:
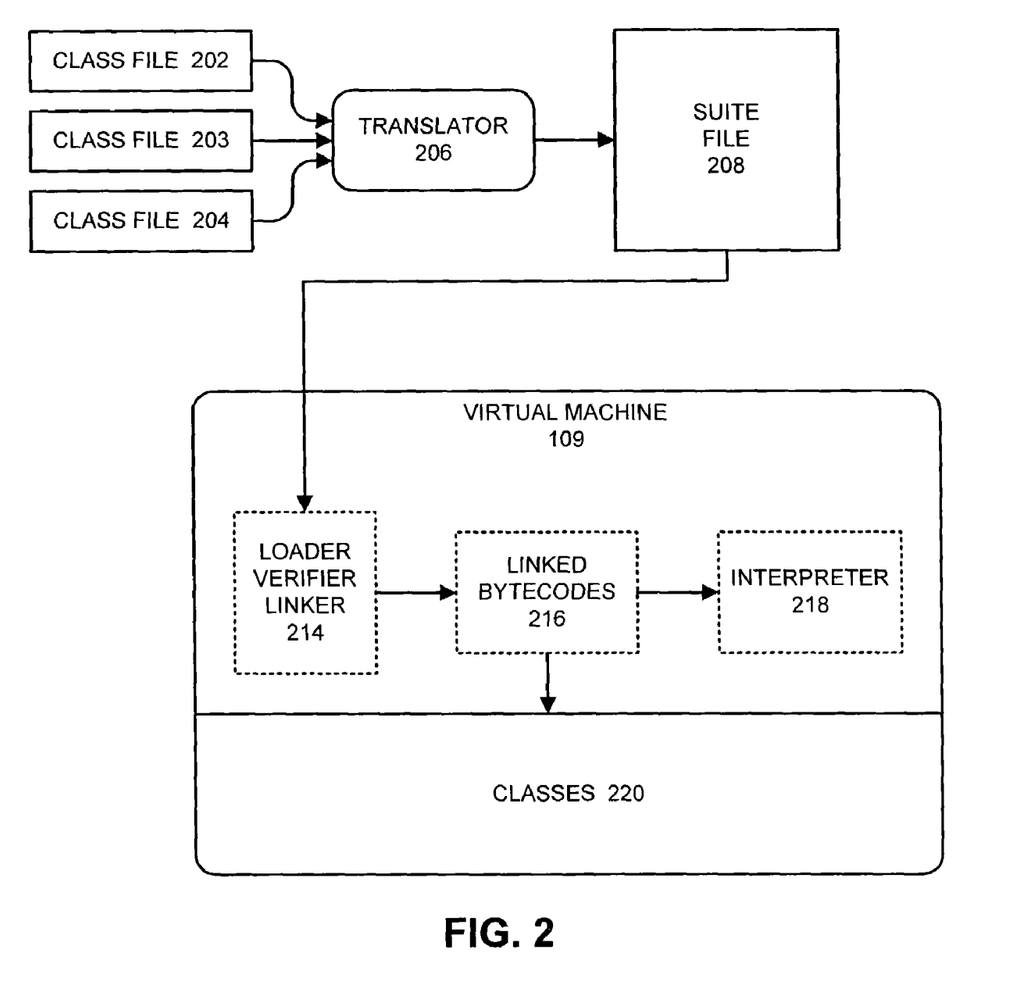
FIG. 2 illustrates how class files are executed on a virtual machine within a smart card in accordance with an embodiment of the present invention.

FIG. 2 illustrates how class files are executed on virtual machine 109 within smart card 100 in accordance with an embodiment of the present invention. In FIG. 2, a number of class files 202–204 (or other types of code modules) are converted by a translator 206 into a suite file 208, which is suitable for execution on virtual machine 109 within smart card 100. Note that this conversion process can take place at a workstation or some other type of computer system that is external to smart card 100.

A number of operations are involved in executing suite file 208 on virtual machine 109. Suite file 208 is first loaded into smart card 100. Next, linker/loader/verifier 214 loads and verifies classes from class files 202–204 and then binds them to library classes 220 within virtual machine 109. This produces linked bytecodes 216. Linked bytecodes 216 are then fed into interpreter 218, which interprets linked bytecodes 216 in order to execute them on virtual machine 109.

During the process of translating class files 202–204 into suite file 208 a number of operations take place. One of these operations converts methods within class files 202–204 to provide only one typemap per method as is described in more detail below with reference to FIG. 3.

Creating a Single Typemap per Method

Figure 3:
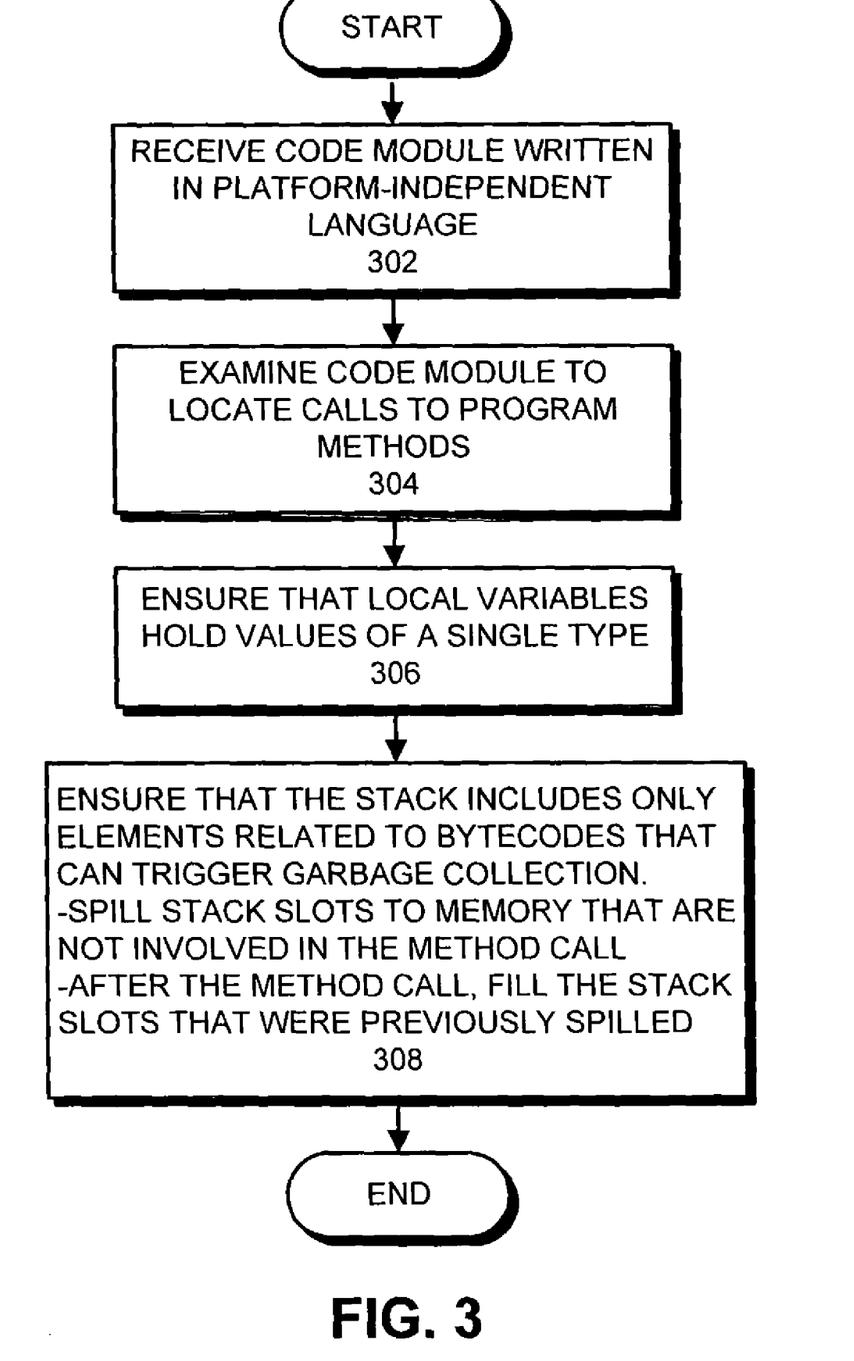
FIG. 3 presents a flow chart illustrating the process of creating only one typemap per method in accordance with an embodiment of the present invention.

FIG. 3 presents a flow chart illustrating the process of transforming a program so that it creates only one typemap for each method in accordance with an embodiment of the present invention. Translator 206 starts when a code module (class files) written in a platform-independent language is received (step 302).

Translator 206 then performs a number of actions while converting the code module into a form suitable for execution on a smart card. First, translator 206 examines the code module to locate calls to program methods (step 304). After locating the calls to the program methods, translator 206 ensures that the local variables hold values of a single type during the call (step 306). During this process, a given local variable associated multiple types can be replaced with multiple local variables are associated with only a single type.

Next, translator 206 ensures that the stack includes only elements related to a currently executing bytecode if the bytecode can trigger a garbage collection cycle (step 308). For example, the system ensures that only parameters related to a method call are on the stack when the method is invoked. In doing so, translator 206 spills stack slots to memory that are not involved in the method call. This removes portions of evaluation stacks between activation records on the stack, and thereby simplifies garbage collection and program verification operations. Finally, after the return from the method call, translator 206 fills the stack slots that were previously spilled.

Variables on a Stack

Figure 4A:
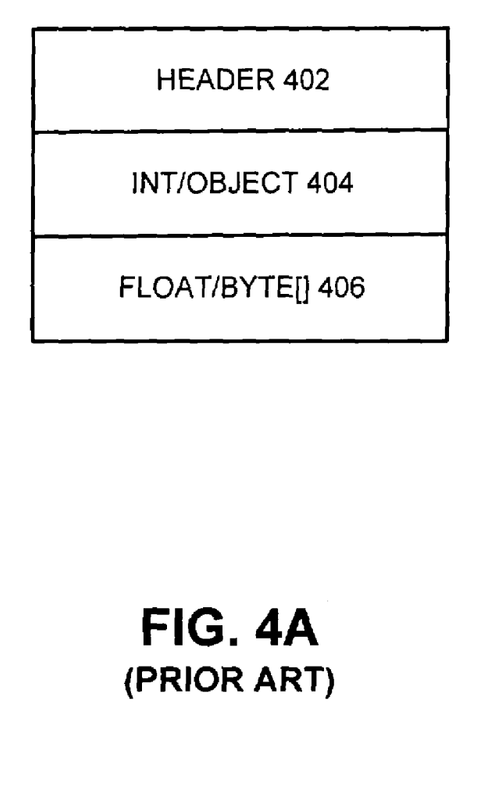
FIG. 4A illustrates variables in a standard Java activation record.

FIG. 4A illustrates variables in a standard Java activation record. The activation record illustrated in FIG. 4A includes header 402, int/object 404, and float/byte[ ] 406. The variable int/object 404 at different times holds either a primitive data type (an int) or a reference (object). Likewise, the variable float/byte[ ] 406 at different times holds either a primitive data type (a float) or a reference (byte[ ]).

Figure 4B:
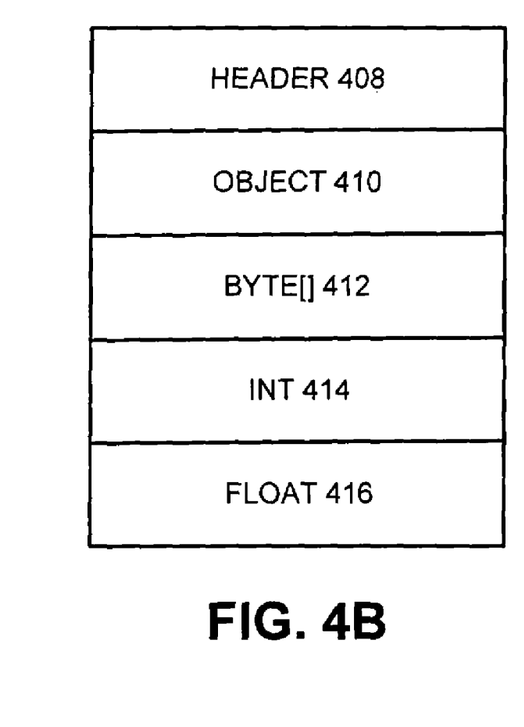
FIG. 4B illustrates variables on a stack in accordance with an embodiment of the present invention.

FIG. 4B illustrates variables on a stack in accordance with an embodiment of the present invention. The stack in FIG. 4B includes header 408, references object 410 and byte[ ] 412, and primitive data types int 414 and float 416. Separating references and primitive data types in this manner allows code verifiers and garbage collectors to know whether a variable is a primitive data type of a reference without testing the variable.

The Stack

Figure 5A:
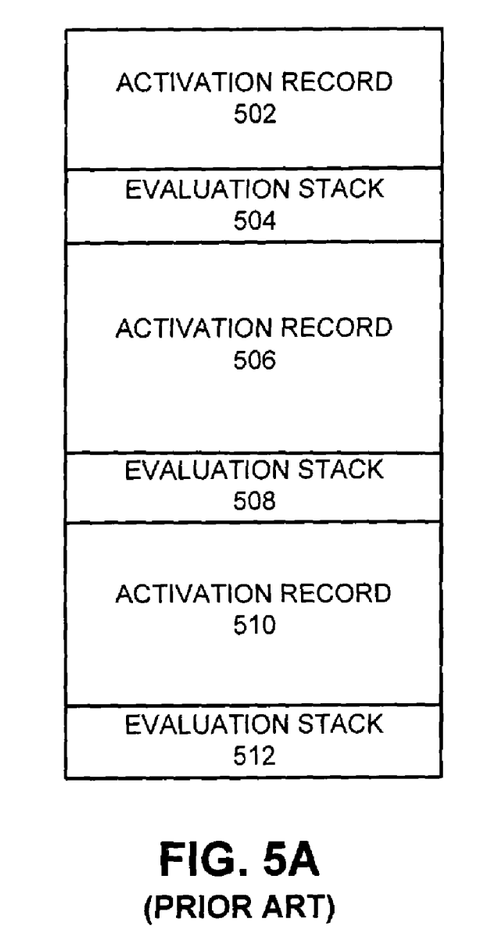
FIG. 5A illustrates a conventional stack.

FIG. 5A illustrates a conventional stack. The conventional stack includes activation record 502, evaluation stack 504, activation record 506, evaluation stack 508, activation record 51.0, and evaluation stack 512. Note that evaluation stack 504 and evaluation stack 508 are embedded between activation record 502, activation record 506, and activation record 510.

Figure 5B:
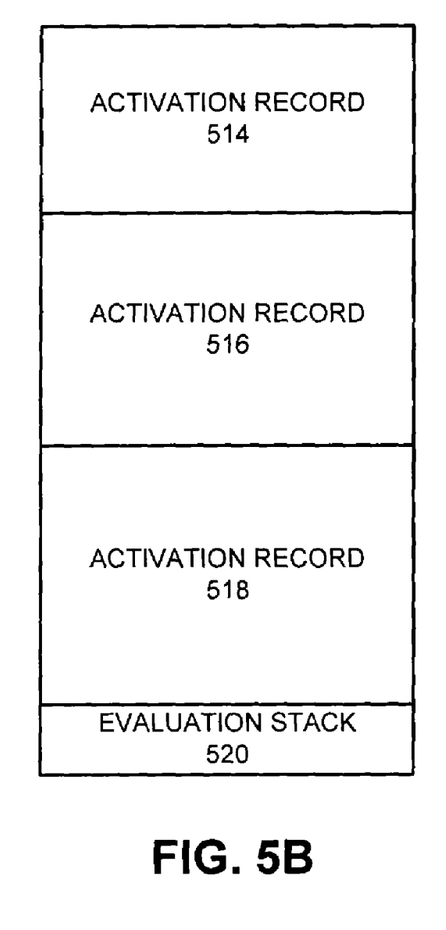
FIG. 5B illustrates a stack in accordance with an embodiment of the present invention.

FIG. 5B illustrates a stack in accordance with an embodiment of the present invention. The stack in FIG. 5B includes activation records 514, 516, and 518 and evaluation stack 520. Note the absence of evaluation stacks between activation records 514 and 516, and between activation records 516 and 518. This absence of evaluation stacks between activation records allows code verification and garbage collection routines to be simplified.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

Transformations for Exact Garbage Collection

The hard part of exact garbage collection in Java is identifying the pointers in activation frames and on the evaluation stack. The translator applies two transformations that make this significantly easier:

Local variables are partitioned into pointer variables and non-pointer variables. This means that a single pointer map per method can describe which slots in an activation record are pointers. Note that this transformation comes for free as a result of the transformation applied to enable on-card verification The evaluation stack is made to be empty ("trimmed") before any instruction that may potentially result in an allocation (and therefore a GC). That is, all values on the stack except for the parameters and operands of the current instruction are spilled before the potentially allocating instruction is executed. The table below shows the list of bytecodes that require stack trimming as well as the reason they may cause an allocation.

| Instruction | Reason |
|---|---|
| checkcast | object allocation |
| instanceof | object allocation |
| getstatic | invocation of <clinit>/initialization |
| putstatic | invocation of <clinit>/initialization |
| invoke* | invocation of <clinit>/initialization/object allocation |
| monitorenter/ exit | invocation of <clinit>/initialization, context switch |
| newdimension | object allocation |
| newarray | object allocation |
| newobject | object allocation |
| clinit | invocation of <clinit>/initialization |

Note that instructions whose only potential allocation related side effect is the exception object for a VM raised exception are not included above. This is because the current state of the evaluation stack is ignored during exception handling and so can be treated as empty should a GC occur when allocating an exception object.

Note also that these transformations only simplify exact GC in VM implementations where thread scheduling is under the explicit control of the VM and the VM ensures that context switching can only occur at one of the instructions listed in the above table.

What is claimed is:

1. A method to facilitate code verification and garbage collection in a platform-independent virtual machine, comprising:
   receiving a code module written in a platform-independent language;
   examining the code module to locate a call to a program method within the code module; and
   transforming the code module so that all operands remaining on an evaluation stack when the program method is called relate to the program method, wherein transforming the code module involves ensuring that the evaluation stack includes only elements related to a bytecode that may trigger garbage collection when the bytecode is executed;
   whereby verification and garbage collection of the code module is simplified.

2. The method of claim 1, wherein transforming the code module involves ensuring that local variables hold only values of a single type and do not hold variables of different types at different times.

3. The method of claim 1, wherein transforming the code module further comprises spilling to memory stack slots that do not include operands for the call to the program method.

4. The method of claim 3, further comprising filling stack slots that were previously spilled upon return from the program method.

5. The method of claim 4, wherein the program method is associated with a single typemap to indicate a type for each variable on the evaluation stack.

6. An apparatus to facilitate code verification and garbage collection in a platform-independent virtual machine, comprising:
   a central processing unit;
   a memory system;
   a receiving mechanism configured to receive a code module written in a platform-independent language;
   an examining mechanism configured to examine the code module to locate a call to a program method within the code module; and a transforming mechanism configured to transform the code module so that all operands remaining on an evaluation stack when the program method is called relate to the program method, wherein transforming the code module involves ensuring that the evaluation stack includes only elements related to a bytecode that may trigger garbage collection when the bytecode is executed;

whereby verification and garbage collection of the code module is simplified.

7. The apparatus of claim 6, wherein transforming the code module involves ensuring that local variables hold only values of a single type and do not hold variables of different types at different times.

8. The apparatus of claim 6, further comprising a spilling mechanism configured to spill to memory stack slots that do not include operands for the call to the program method when transforming the code module.

9. The apparatus of claim 8, further comprising a filling mechanism configured to fill stack slots that were previously spilled upon return from the program method.

10. The apparatus of claim 9, wherein the program method is associated with a single typemap to indicate a type for each variable on the evaluation stack.

11. A computer system to facilitate code verification and garbage collection in a platform-independent virtual machine, comprising:
a central processing unit;
a memory system;
a port for communicating with an external client;
a bus to couple the central processing unit, the memory system, and the port;
a receiving mechanism within the central processing unit configured to receive a code module written in a platform-independent language;
an examining mechanism configured to examine the code module to locate a call to a program method within the code module; and
a transforming mechanism configured to transform the code module so that all operands remaining on an evaluation stack when the program method is called relate to the program method, wherein transforming the code module involves ensuring that the evaluation stack includes only elements related to a bytecode that may trigger garbage collection when the bytecode is executed;

whereby verification and garbage collection of the code module is simplified.

12. The computer system of claim 11, wherein transforming the code module involves ensuring that local variables hold only values of a single type and do not hold variables of different types at different times.

13. The computer system of claim 11, further comprising a spilling mechanism configured to spill to memory stack slots that do not include operands for the call to the program method when transforming the code module.

14. The computer system of claim 13, further comprising a filling mechanism configured to fill stack slots that were previously spilled upon return from the program method.

15. The computer system of claim 14, wherein the program method is associated with a single typemap to indicate a type for each variable on the evaluation stack.

* * * * *